United States Patent
Imaoka et al.

(10) Patent No.: US 12,441,914 B2
(45) Date of Patent: Oct. 14, 2025

(54) AQUEOUS EMULSION AND ADHESIVE USING SAME

(71) Applicant: KURARAY CO., LTD., Kurashiki (JP)

(72) Inventors: Yoriko Imaoka, Kurashiki (JP); Keisuke Morikawa, Houston, TX (US); Tatsuya Tanida, Frankfurt am Main (DE)

(73) Assignee: KURARAY CO., LTD., Kurashiki (JP)

( * ) Notice: Subject to any disclaimer, the term of this patent is extended or adjusted under 35 U.S.C. 154(b) by 723 days.

(21) Appl. No.: 17/601,232

(22) PCT Filed: Apr. 2, 2020

(86) PCT No.: PCT/JP2020/015138
§ 371 (c)(1),
(2) Date: Oct. 4, 2021

(87) PCT Pub. No.: WO2020/204120
PCT Pub. Date: Oct. 8, 2020

(65) Prior Publication Data
US 2022/0177733 A1 Jun. 9, 2022

(30) Foreign Application Priority Data
Apr. 5, 2019 (JP) .................. 2019-072599

(51) Int. Cl.
*C09J 4/06* (2006.01)
*C09J 11/06* (2006.01)
*C09J 11/08* (2006.01)
*C09J 129/04* (2006.01)

(52) U.S. Cl.
CPC .............. *C09J 4/06* (2013.01); *C09J 11/06* (2013.01); *C09J 11/08* (2013.01); *C09J 129/04* (2013.01)

(58) Field of Classification Search
CPC ..... C09J 4/06; C09J 11/06; C09J 11/08; C09J 129/04
See application file for complete search history.

(56) References Cited

U.S. PATENT DOCUMENTS

| | | | |
|---|---|---|---|
| 5,599,870 A | 2/1997 | Nakamae et al. | |
| 5,763,508 A | 6/1998 | Hess et al. | |
| 2002/0028871 A1 | 3/2002 | Kawahara | |
| 2009/0018252 A1 | 1/2009 | Maki et al. | |
| 2016/0251466 A1* | 9/2016 | Kato | B41M 5/5254 |
| | | | 428/32.39 |
| 2017/0174971 A1 | 6/2017 | Kumaki et al. | |
| 2020/0291217 A1* | 9/2020 | Tanida | C09J 129/04 |
| 2020/0392364 A1* | 12/2020 | Morikawa | C09D 129/04 |

FOREIGN PATENT DOCUMENTS

| | | |
|---|---|---|
| EP | 3 699 207 A1 | 8/2020 |
| EP | 3 725 845 A1 | 10/2020 |
| JP | 2-233753 A | 9/1990 |
| JP | 6-183805 A | 7/1994 |
| JP | 8-81666 A | 3/1996 |
| JP | 9-118753 A | 5/1997 |
| JP | 10-121017 A | 5/1998 |
| JP | 11-21788 A | 1/1999 |
| JP | 11-106727 A | 4/1999 |
| JP | 2001-123138 A | 5/2001 |
| JP | 2010-168500 A | 8/2010 |
| WO | WO 2006/095524 A1 | 9/2006 |
| WO | WO 2015/151910 A1 | 10/2015 |
| WO | WO 2019/117118 A1 | 6/2019 |

OTHER PUBLICATIONS

Brandrup et al ("Polymer Handbook" Fourth edition, 1999) (Year: 1999).*
International Search Report issued on Jun. 23, 2020 in PCT/JP2020/015138 filed on Apr. 2, 2020, 4 pages.
U.S. Appl. No. 16/756,243, filed Apr. 15, 2020, US 2020/0299435 A1, Tatsuya Tanida, et al.
U.S. Appl. No. 16/771,399, filed Jun. 10, 2020, US 2020/0392364 A1, Keisuke Morikawa, et al.
Extended European Search Report issued Nov. 21, 2022 in European Patent Application No. 20783534.9, 6 pages.

* cited by examiner

Primary Examiner — Jiangtian Xu
(74) Attorney, Agent, or Firm — Oblon, McClelland, Maier & Neustadt, L.L.P.

(57) ABSTRACT

An aqueous emulsion may include an ethylene-vinyl alcohol copolymer (A) as a dispersant and a polymer (B) which contains an ethylenically unsaturated monomer unit as a dispersoid, wherein the ethylene-vinyl alcohol copolymer (A) has an ethylene unit content of 1 mol % or more and less than 20 mol %; and a crystallinity in water at 30° C. (Cw (30° C.)) and a crystallinity in water at 70° C. (Cw (70° C.)) as determined by pulse NMR satisfying formula (I). Such aqueous emulsions can form fewer aggregates and exhibit excellent water-resistant adhesiveness and excellent film formability.

19 Claims, No Drawings

AQUEOUS EMULSION AND ADHESIVE USING SAME

CROSS-REFERENCE TO RELATED APPLICATIONS

The present application is the national stage of international application PCT/JP2020/015138, filed on Apr. 2, 2020, and claims the benefit of the filing date of Japanese Appl. No. 2019-072599, filed on Apr. 5, 2019.

TECHNICAL FIELD

The present invention relates to an aqueous emulsion comprising a particular ethylene-vinyl alcohol copolymer. The present invention also relates to an adhesive prepared using the aqueous emulsion. The present application claims priority to Japanese patent application No. 2019-072599, filed on Apr. 5, 2019, which is incorporated herein by reference in its entirety.

BACKGROUND ART

Vinyl alcohol polymers represented by a polyvinyl alcohol (hereinafter, sometimes abbreviated as "PVA") is known to be a water-soluble synthetic polymer, which is extensively used in various applications such as a paper processing agent, a fiber processing agent, an inorganic binder, an adhesive, a stabilizer for emulsion polymerization and suspension polymerization, in addition to applications such as raw materials for a fiber and a film. In particular, a PVA is known to be a protective colloid for emulsion-polymerizing a vinyl ester monomer represented by vinyl acetate, and a vinyl ester-based aqueous emulsion prepared by emulsion polymerization using a PVA as a stabilizer for emulsion polymerization has been extensively used for applications such as various adhesives for woodworking or the like, a coating base, a coating agent, various binders for an impregnated paper, a nonwoven product or the like, an admixture, a placing joint material, paper processing, fiber processing and the like.

However, when a PVA is used as a stability for emulsion polymerization, it is known that an aqueous emulsion prepared by emulsion polymerization is less water-resistant. To solve the problem, Patent Reference No. 1 has proposed an emulsion prepared by copolymerizing vinyl acetate monomer with N-methylolacrylamide, wherein higher water resistance is achieved by a crosslinking reaction of a structure derived from the N-methylolacrylamide monomer. However, this method leads to insufficient water resistance at a low temperature and insufficient storage stability, and also leads to an environmental problem of generation of formaldehyde, which is one of the causative substances of sick house syndrome.

Furthermore, Patent Reference No. 2 has suggested, as an aqueous emulsion exhibiting higher water resistance than any of conventional PVAs, an aqueous emulsion prepared using a PVA containing an α-olefin unit having 4 or less carbon atoms in a particular proportion as a dispersant and a polymer of one or more monomers selected from ethylenically unsaturated monomers as a dispersoid. Furthermore, Patent Reference Nos. 3 and 4 have suggested that using an ethylene-vinyl alcohol copolymer as a protective colloid, vinyl acetate, or vinyl acetate and a (meth)acrylic acid ester are emulsion-polymerized.

However, since the ethylene-vinyl alcohol copolymer contains hydrophobic ethylene units, it is less soluble in water than an unmodified PVA, leading to some undissolved residual matter during preparation of an aqueous solution (hereinafter, sometimes abbreviated as "insoluble matter"). On the other hand, if a saponification degree is lowered in order to suppress formation of insoluble matter, particles may aggregate with each other during dissolution to form lumps. An aqueous vinyl ester emulsion prepared by emulsion polymerization in an aqueous solution containing insoluble matters and lumps contains a large amount of aggregates, and when the aqueous emulsion is used as an adhesive, adhesive force tends to be reduced due to unevenness of the adhesive layer.

PRIOR ART REFERENCES

Patent References

Patent Reference No. 1: JP 10-121017 A
Patent Reference No. 2: JP 8-081666 A
Patent Reference No. 3]: JP 11-106727 A
Patent Reference No. 4: JP 2001-123138 A

SUMMARY OF THE INVENTION

Problems to be Solved by the Invention

Under the above circumstances, an objective of the present invention is to provide an aqueous emulsion which contains a particular ethylene-vinyl alcohol copolymer as a dispersant, forms less aggregates and is excellent in film formability and water resistance. Another objective of the present invention is to provide an adhesive produced using the aqueous emulsion.

Means for Solving the Problems

The above problems can be solved by providing an aqueous emulsion comprising an ethylene-vinyl alcohol copolymer (A) as a dispersant and a polymer (B) containing an ethylenically unsaturated monomer unit as a dispersoid, wherein the ethylene-vinyl alcohol copolymer (A) has an ethylene unit content of 1 mol % or more and less than 20 mol %; and a crystallinity in water at 30° C. (Cw (30° C.)) and a crystallinity in water at 70° C. (Cw (70° C.)) as determined by pulse NMR satisfying formula (I).

$$4 \leq \frac{100 - Cw(30°C)}{100} \times [Cw(30°C) - Cw(70°C)] \leq 22 \quad (I)$$

Herein, it is preferable that the ethylene-vinyl alcohol copolymer (A) has a viscosity-average polymerization degree of 200 to 5000 and a saponification degree of 85 to 99.9 mol %.

Herein, it is also preferable that the polymer (B) is a polymer having a particular unit derived from at least one selected from the group consisting of a vinyl ester monomer, a (meth)acrylic acid ester monomer, a styrenic monomer and a diene monomer; and a content of the particular unit is 70% by mass or more based on the total monomer units of the polymer (B).

Herein, it is also preferable that a mass ratio (A)/(B) of the ethylene-vinyl alcohol copolymer (A) to the polymer (B) is 98/2 to 80/20 based on a solid content.

Herein, it is also preferable that the aqueous emulsion further comprises an additive (C), and the additive (C) is an alkylene glycol derivative having a solubility parameter (SP value) of 19.0 to 24.0 (MPa)$^{1/2}$.

An adhesive prepared using the aqueous emulsion as described above is also a preferable embodiment of the present invention.

A method for producing the aqueous emulsion as described above, comprising emulsion-polymerizing the ethylenically unsaturated monomer in the presence of the dispersant containing the ethylene-vinyl alcohol copolymer (A) is also a preferable embodiment of the present invention.

Herein, it is preferable that in the ethylene-vinyl alcohol copolymer (A), a content of particles passing through a sieve with a mesh size of 2.5 mm is 80% by mass or more, and a content of particles passing through a sieve with a mesh size of 0.15 mm is 20% by mass or less.

Effects of the Invention

An aqueous emulsion of the present invention forms less aggregates and is excellent in water-resistant adhesiveness and film formability. Therefore, the aqueous emulsion is suitably used for various adhesives, paints, fiber processing agents, paper processing agents, inorganic binders, cement admixtures, mortar primers and the like.

MODES FOR CARRYING OUT THE INVENTION

An aqueous emulsion of the present invention is characterized by comprising an ethylene-vinyl alcohol copolymer (A) as a dispersant and a polymer (B) containing an ethylenically unsaturated monomer unit as a dispersoid, wherein the ethylene-vinyl alcohol copolymer (A) has an ethylene unit content of 1 mol % or more and less than 20 mol %; and a crystallinity in water at 30° C. (Cw (30° C.)) and a crystallinity in water at 70° C. (Cw (70° C.)) as determined by pulse NMR satisfying formula (I).

$$4 \leq \frac{100 - Cw(30°C)}{100} \times [Cw(30°C) - Cw(70°C)] \leq 22 \quad (I)$$

[Ethylene-Vinyl Alcohol Copolymer (A)]

An ethylene-vinyl alcohol copolymer (A) contained in an aqueous emulsion of the present invention is particularly characteristic in that an ethylene unit content is 1 mol % or more and less than 20 mol %; and a crystallinity in water at 30° C. (Cw (30° C.)) and a crystallinity in water at 70° C. (Cw (70° C.)) as determined by pulse NMR (nuclear magnetic resonance absorption) satisfy formula (I). It will be described below.

(Crystallinity in Water)

First, meaning of analyzing a polymer sample by pulse NMR spectroscopy will be described. In a pulse NMR spectrometer, there is a magnetostatic field generated by an electromagnet in the spectrometer. In a magnetostatic field, a nuclear spin direction of a hydrogen nucleus is aligned to the direction of the magnetostatic field. When a pulsed field is applied to such a state, the nuclear spin of the hydrogen nucleus is aligned to a direction perpendicular to the magnetostatic field, that is, an excited state. Then, a process to the state that the direction of the excited nuclear spin macroscopically returns to the original direction of the magnetostatic field is called as $T_2$ relaxation or transverse relaxation, and a time for the process is called as a relaxation time (Tau). For relaxation of a single component, a magnetization intensity (y) at a time (t) is represented by formula (II) using a relaxation strength (A) in an excited state, a relaxation time (Tau) and constants ($y_0$, W). In the equation, W is a Weibull coefficient. When W=1, formula (II) becomes an Exp type while when W=2, it becomes a Gaussian type. For a common polymer sample, $1 \leq W \leq 2$.

$$y = y_0 + A \times \exp\left[-\frac{1}{W} \times \left(\frac{t}{Tau}\right)^W\right] \quad (II)$$

In $T_2$ relaxation, a hydrogen nucleus attenuates while exchanging energy with another hydrogen nucleus. Therefore, when molecular mobility of the sample is high, interaction between mutually adjacent protons is small so that energy attenuation of the whole system unlikely occurs, resulting in a longer relaxation time. In contrast, when its molecular mobility is low, a relaxation time is shorter. Therefore, for a crystalline polymer material, a relaxation time is shorter in a crystal region while a relaxation time is longer in an amorphous region. An actual crystalline polymer has a crystal region and an amorphous region, and in its relaxation curve, the sum of a relaxation component derived from the crystal region with a shorter relaxation time and a relaxation component derived from the amorphous region with a longer relaxation time is observed. A magnetization intensity (y) of the whole sample at time (t) is represented by formula (III) using a constant ($y_0$), where a relaxation strength derived from the crystal region is $A_1$, a relaxation strength derived from the amorphous region is $A_2$, a relaxation time derived from the crystal region is $Tau_1$, and a relaxation time derived from the amorphous region is $Tau_2$. Here, $y_0$ is a component originating from a thermal noise derived from a measurement device, which is a parameter independent of time t and affects neither a relaxation strength ($A_1$) nor a relaxation strength ($A_2$). A crystallinity in water (Cw) is not influenced by $y_0$. Since a crystalline component often shows Gaussian relaxation, W is fixed at W=2 in the first term representing a crystalline component in formula (III). $A_1/(A_1+A_2)$ derived from this formula is a crystallinity as determined by pulse NMR. Herein, pulse NMR measurement was conducted using pulse sequence called as a Solid-echo method.

$$y = y_0 + A_1 \times \exp\left[-0.5 \times \left(\frac{t}{Tau_1}\right)^2\right] + A_2 \times \exp\left[-\frac{1}{W} \times \left(\frac{t}{Tau_2}\right)^W\right] \quad (III)$$

As described above, a ratio of a crystalline component to an amorphous component in a polymer sample can be determined from a relaxation curve obtained by pulse NMR. An ethylene-vinyl alcohol copolymer is a hydrophilic polymer having a number of hydroxy groups, and thus is swollen in water, leading to reduction in crystallinity, a degree of which significantly depends on a water temperature. At a higher water temperature, a swelling degree increases, so that crystallinity is reduced. We have herein focused on a crystallinity in water at 30° C. (Cw (30° C.)) and a crystallinity in water at 70° C. (Cw (70° C.)) as determined by pulse NMR. Here, the ethylene-vinyl alcohol copolymer (A) is a water-soluble polymer, but for dissolving the once crystallized ethylene-vinyl alcohol copolymer (A) in water, a high-temperature condition and stirring are required. Thus, when it is placed in water at 30° C. or 70° C., the sample is not dissolved but swollen, that is, it exists as the solid. It is, therefore, measured in the solid state during the pulse NMR analysis described above.

An ethylene-vinyl alcohol copolymer (A) of the present invention satisfies formula (I). Here, a crystallinity in water (Cw) is a parameter not determined by the absolute value of a relaxation time but by relaxation strengths (A$_1$) and (A$_2$) which are ratios of two divided components with a different relaxation time constituting a system. These relaxation strengths (A$_1$) and (A$_2$) are not influenced by variation of a resonant frequency, and thus a crystallinity in water (Cw) is not influenced by a resonant frequency.

$$4 \le \frac{100 - Cw(30°C)}{100} \times [Cw(30°C) - Cw(70°C)] \le 22 \quad (I)$$

In formula (I), [(100−Cw(30° C.))/100] represents a ratio of an amorphous region at 30° C., and takes a value of 0 to 1. Furthermore, [Cw(30° C.)−Cw(70° C.)] is a difference between crystallinities in water between at 30° C. and 70° C., that is, an indicator of increase in an amorphous region associated with water-temperature increase, and takes a value of 0 to 100. Therefore, formula (I) as multiplication of these is an indicator of solubility of the ethylene-vinyl alcohol copolymer (A), and the value of formula (I) is more influenced by a larger absolute value of [Cw(30° C.)−Cw(70 CC)]. Generally, an ethylene-vinyl alcohol copolymer (A) with an ethylene unit content of 1 mol % or more and less than 20 mol % is soluble in water because of a smaller content of ethylene units. Such a water-soluble ethylene-vinyl alcohol copolymer generally have a large value of [(100−Cw(30° C.))/100] and a small value of [Cw(30° C.)−Cw(70° C.)], resulting in a small value of formula (I), or alternatively, have a small value of [(100−Cw(30° C.))/100] and a large value of [Cw(30° C.)−Cw(70° C.)], resulting in a large value of formula (I). Specifically, when a value of formula (I) is less than 4, the particles are soluble at a low temperature while easily forming a lump, and once formed, the lump is less soluble in water, leading to a longer time for complete dissolution. The lower limit of formula (I) is preferably 5 or more, more preferably 6 or more. On the other hand, when a value of formula (I) is more than 22, solubility in water is reduced, leading to a longer time for complete dissolution. The upper limit of formula (I) is preferably 21 or less, more preferably 20 or less. When formula (I) satisfies a particular range, an ethylene-vinyl alcohol copolymer which is rapidly dissolved and do not easily form a lump during dissolution can be obtained.

For measurement, a sample of ethylene-vinyl alcohol copolymer (A) is still placed in H$_2$O-d$_2$ at each temperature (30° C., 70° C.) for 40 min, followed by pulse NMR spectroscopy at the same temperature as that during still placing. The range from 0 to 0.8 ms in a relaxation curve obtained is fitted to formula (III) using the least square error method.

When being dissolved in water, an ethylene-vinyl alcohol copolymer (A) satisfying formula (I) forms less insoluble matters or aggregates derived from lumps. Therefore, for example, by emulsion-polymerizing an ethylenically unsaturated monomer using an ethylene-vinyl alcohol copolymer (A) as a stabilizer for emulsion polymerization, an aqueous emulsion which forms less aggregates and is excellent in water-resistant adhesiveness and film formability can be obtained.

An ethylene-vinyl alcohol copolymer (A) satisfying formula (I) can be produced by a special method for producing an ethylene-vinyl alcohol copolymer comprising a polymerization step, a saponification step, a pulverizing step, a deliquoring step and a drying step. The production method will be detailed later. By employing such a special production method, the present invention has for the first time provided an ethylene-vinyl alcohol copolymer (A) which satisfy formula (I) and which is highly soluble in water. An ethylene-vinyl alcohol copolymer (A) will be further detailed below.

(Vinyl Ester)

An ethylene-vinyl alcohol copolymer (A) is produced by a method comprising a step of saponifying an ethylene-vinyl ester copolymer prepared by copolymerizing ethylene with a vinyl ester. Examples of a vinyl ester which can be used include vinyl formate, vinyl acetate, vinyl propionate, vinyl valerate, vinyl caprate, vinyl laurate, vinyl stearate, vinyl benzoate, vinyl pivalate and vinyl versatate, particularly preferably vinyl acetate.

(Ethylene Unit Content)

A content of ethylene units in an ethylene-vinyl alcohol copolymer (A) is 1 mol % or more and less than 20 mol %. If a content of ethylene units is less than 1 mol %, water-resistant adhesiveness of the aqueous emulsion is deteriorated. A content of ethylene units is preferably 1.5 mol % or more, more preferably 2 mol % or more. If a content of ethylene units is 20 mol % or more, the ethylene-vinyl alcohol copolymer (A) is insoluble in water, and preparation of an aqueous solution becomes difficult. A content of ethylene units is preferably 15 mol % or less, more preferably 10 mol % or less, further preferably 8.5 mol % or less.

A content of ethylene units is determined, for example, by $^1$H-NMR of an ethylene-vinyl ester copolymer as a precursor or re-acetylation product of an ethylene-vinyl alcohol copolymer (A). A sample of the ethylene-vinyl ester copolymer is reprecipitation-purified three or more times using a mixed solution of n-hexane and acetone, and dried at 80° C. for three days under reduced pressure to prepare an ethylene-vinyl ester copolymer for analysis. The ethylene-vinyl ester copolymer for analysis is dissolved in DMSO-d$_6$ followed by $^1$H-NMR (500 MHz) analysis at 80° C. A content of ethylene units can be calculated using peaks derived from a main-chain methine of the vinyl ester (4.7 to 5.2 ppm) and peaks derived from a main-chain methylene of ethylene and the vinyl ester (0.8 to 1.6 ppm).

(Saponification Degree)

A saponification degree of an ethylene-vinyl alcohol copolymer (A) is, but not limited to, preferably 80 to 99.99 mol %. If a saponification degree is less than 80 mol %, solubility of the ethylene-vinyl alcohol copolymer (A) in the aqueous solution obtained is insufficient. A saponification degree is more preferably 82 mol % or more, further preferably 85 mol % or more. On the other hand, if a saponification degree is more than 99.99 mol %, stable production of an ethylene-vinyl alcohol copolymer (A) tends to be difficult. A saponification degree is more preferably 99.5 mol % or less, further preferably 99 mol % or less, particularly preferably 98.5 mol % or less. A saponification degree of an ethylene-vinyl alcohol copolymer (A) can be determined in accordance with JIS K6726 (1994).

(Viscosity-Average Polymerization Degree)

A viscosity-average polymerization degree of an ethylene-vinyl alcohol copolymer (A) is, but not limited to, preferably 200 to 5000. If a viscosity-average polymerization degree is less than 200, storage stability of an aqueous emulsion obtained is lowered. The viscosity-average polymerization degree is more preferably 250 or more, further preferably 300 or more, particularly preferably 400 or more. If a viscosity-average polymerization degree is more than 5000, viscosity of an aqueous solution of the ethylene-vinyl alcohol copolymer tends to be too high to be handled. The viscosity-average polymerization degree is more preferably 4500 or less, further preferably 4000 or less, particularly preferably 3500 or less. A viscosity-average polymerization degree P can be measured in accordance with JIS K6726 (1994). Specifically, the ethylene-vinyl alcohol copolymer (A) is re-saponified to a saponification degree of 99.5 mol % or more and purified, and then P can be calculated by the following equation using a limiting viscosity [η] (L/g) as determined in water at 30° C.

$$P=([\eta]\times 10000/8.29)^{(1/0.62)}$$

(Other Monomer Units)

An ethylene-vinyl alcohol copolymer (A) can contain monomer units other than vinyl alcohol units, ethylene units and vinyl ester units as long as the effects of the present invention are not impaired. Examples of such monomers include α-olefins such as propylene, n-butene and isobutylene; acrylic acid and salts thereof; acrylic acid esters; methacrylic acid and salts thereof; methacrylic acid esters; acrylamides; acrylamide derivatives such as N-methylacrylamide, N-ethylacrylamide, N,N-dimethylacrylamide, diacetone acrylamide, acrylamide propanesulfonic acid and salts thereof, acrylamide propyldimethylamine and salts or quaternary salts thereof, N-methylol acrylamide and derivatives thereof; methacrylamide; methacrylamide derivatives such as N-methylmethacrylamide, N-ethylmethacrylamide, methacrylamide propanesulfonic acid and salts thereof, methacrylamide propyldimethylamine and salts or quaternary salts thereof, N-methylol methacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate and allyl chloride; unsaturated dicarboxylic acids and salts or esters thereof such as maleic acid, itaconic acid and fumaric acid; vinylsilyl compounds such as vinyltrimethoxysilane; and isopropenyl acetate. A content of these monomers is, depending on an objective or use thereof, preferably 10 mol % or less, more preferably less than 5 mol %, further preferably less than 1 mol %, particularly preferably less than 0.5 mol %.

[Method for Producing an Ethylene-Vinyl Alcohol Copolymer (A)]

A preferable method for producing an ethylene-vinyl alcohol copolymer (A) is a production method comprising a polymerization step of copolymerizing ethylene and a vinyl ester to give an ethylene-vinyl ester copolymer; a saponification step of saponifying the ethylene-vinyl ester copolymer to give a solid block comprising an ethylene-vinyl alcohol copolymer and a solvent; a pulverizing step of pulverizing the solid block to give wet particles; a deliquoring step of mechanically removing some of the solvent from the wet particles to give deliquored particles; and a drying step of removing the remaining solvent from the deliquored particles by heating to give dry particles, wherein the deliquored particles contain 40 to 65% by mass of the solvent; and in the deliquored particles, a content of particles passing through a sieve with a mesh size of 5.6 mm is 80% by mass or more, and a content of particles passing through a sieve with a mesh size of 1.0 mm is less than 2% by mass.

It is important that like the above production method, deliquored particles obtained by pulverizing the solid block after the saponification step and then deliquoring them contain a particular rate of the solvent and have a particular particle size distribution. Thus, in the course of preparing an aqueous solution of an ethylene-vinyl alcohol copolymer (A), a lump is not formed, resulting in a higher solution rate. There will be detailed each step of the production method.

(Polymerization Step)

A vinyl ester can be copolymerized with ethylene by a well-known method such as bulk polymerization, solution polymerization, suspension polymerization and emulsion polymerization. Among these, bulk polymerization or solution polymerization in which polymerization proceeds in a neat system or in an organic solvent such as an alcohol can be generally employed, and preferably a solution polymerization is employed. Examples of the alcohol include lower alcohols such as methanol and ethanol, particularly preferably methanol. Polymerization can be carried out by any style of batch polymerization, semi-batch polymerization and continuous polymerization. A polymerization reactor can be a batch reactor, a tube reactor, a continuous stirred tank reactor or the like. An initiator used for the copolymerization can be selected from known initiators such as azo initiators and peroxide initiators including 2,2'-azobis(isobutyronitrile), 2,2'-azobis(4-methoxy-2,4-dimethylvaleronitrile), 2,2'-azobis(2,4-dimethyl-valeronitrile), benzoyl peroxide and n-propyl peroxydicarbonate.

There are no particular restrictions to a polymerization temperature, and it is preferably about 0 to 180° C., more preferably room temperature to 160° C., further preferably 30 to 150° C. When polymerization is conducted at a temperature of a boiling point of a solvent used in polymerization or lower, either of boiling polymerization under reduced pressure and non-boiling polymerization under normal pressure can be selected. When polymerization is conducted at a temperature of a boiling point of a solvent used in polymerization or higher, either of non-boiling under pressure and boiling polymerization under pressure can be selected.

An ethylene pressure in a polymerization reactor during polymerization is preferably 0.01 to 0.9 MPa, more preferably 0.05 to 0.7 MPa, further preferably 0.1 to 0.65 MPa. A polymerization ratio at an outlet of a polymerization reactor is, but not limited to, preferably 10 to 90%, more preferably 15 to 85%.

In the polymerization, a chain transfer agent can coexist for adjusting a viscosity-average polymerization degree of the resulting ethylene-vinyl ester copolymer. Preferable examples of a chain transfer agent include aldehydes such as acetaldehyde, propionaldehyde, butylaldehyde and benzaldehyde; ketones such as acetone, methyl ethyl ketone, hexanone and cyclohexanone; mercaptans such as 2-hydroxyethane thiol; thiocarboxylic acids such as thioacetic acid; and halogenated hydrocarbons such as trichloroethylene and perchloroethylene. Inter alia, aldehydes and ketones can be suitably used. The amount of the chain transfer agent depends on a chain transfer constant of the chain transfer agent added and a viscosity-average polymerization degree of a targeted ethylene-vinyl ester copolymer, and generally it is 0.1 to 10 parts by mass based on 100 parts by mass of a vinyl ester used.

(Saponification Step)

The ethylene-vinyl ester copolymer obtained in the polymerization step is saponified by alcoholysis or hydrolysis in the presence of a catalyst in an organic solvent. Examples of a catalyst used in the saponification step include basic catalysts such as sodium hydroxide, potassium hydroxide and sodium methoxide; and acidic catalysts such as sulfuric acid, hydrochloric acid and p-toluenesulfonic acid. Examples of an organic solvent used in the saponification step include, but not limited to, alcohols such as methanol and ethanol; esters such as methyl acetate and ethyl acetate; ketones such as acetone and methyl ethyl ketone; and aromatic hydrocarbons such as benzene and toluene. These can be used alone or in combination of two or more. Among these, it is convenient and preferable that saponification reaction is conducted in the presence of sodium hydroxide as a basic catalyst using methanol or a mixed solution of methanol and methyl acetate as a solvent. The amount of the saponification catalyst is preferably 0.001 to 0.5 as a molar ratio to vinyl ester monomer units in the ethylene-vinyl ester copolymer. The molar ratio is more preferably 0.002 or more. The molar ratio is more preferably 0.4 or less, further preferably 0.3 or less.

A suitable embodiment of the saponification step is as follows. First, a saponification catalyst such as sodium hydroxide is added to a solution of the ethylene-vinyl ester copolymer obtained in the polymerization step, followed by admixing. Here, a solvent is preferably methanol. At the initiation of admixing, the mixture is a homogeneous liquid, and as the saponification reaction proceeds and the vinyl ester units in the polymer are saponified and converted to vinyl alcohol units, solubility in the solvent is reduced so that the polymer precipitates from the solution. Here, the solution contains methyl acetate formed by alcoholysis by methanol. As the saponification proceeds, the amount of polymer precipitate gradually increases to give a slurry which then loses fluidity. Therefore, for allowing the saponification reaction to homogeneously proceed, it is important that the system is fully admixed before loss of fluidity.

There are no particular restrictions to a method for mixing a solution of an ethylene-vinyl ester copolymer and a saponification catalyst, and various methods such as a static mixer, a kneader and a stirring blade. Preferably, a static mixer is used because it can achieve continuous and homogeneous mixing. Here, in a pipe connected to a polymerization tank, a saponification catalyst is added to the solution of the ethylene-vinyl ester copolymer after the polymerization step, and then the mixture is passed through a static mixer for mixing to give a paste. A reaction temperature in the static mixer is generally 20 to 80° C.

There are no particular restrictions to a method for allowing a saponification reaction of the ethylene-vinyl ester copolymer in the paste passing through the static mixer to proceed, and a preferable method is by placing the paste on a moving belt and moving the belt in a tank kept at a constant temperature while allowing the saponification reaction to proceed. The paste on the belt loses fluidity to be a solid state and the saponification reaction further proceeds in a solid state. This method allows for continuously proceeding the saponification reaction in a solid state, giving a solid block containing the ethylene-vinyl alcohol copolymer and the solvent. A saponification temperature is preferably 20 to 60° C. If a saponification temperature is too low, a reaction rate is reduced. A saponification temperature is preferably 25° C. or higher, further preferably 30° C. or higher. If a saponification temperature is too high, a large amount of the solvent evaporates, so that a solvent content in a solid block obtained is reduced, leading to deterioration in solubility of the ethylene-vinyl alcohol copolymer obtained. A saponification temperature is more preferably 55° C. or lower, further preferably 50° C. or lower. A saponification time is preferably 5 min or more and 2 hours or less. A saponification time is more preferably 8 min or more, further preferably 10 min or more. A saponification time is more preferably 1 hour or less, further preferably 45 min or less.

(Pulverizing Step)

The solid block obtained in the saponification step is pulverized to give wet particles containing a solvent. There are no particular restrictions to a pulverizer used herein as long as a rotation speed or the like of the pulverizer can be adjusted to achieve a particle size distribution as described later, and any known pulverizer or crusher can be used. In terms of dynamic properties of an ethylene-vinyl alcohol copolymer obtained through the saponification step, a cutting type crusher such as a cutter mill, a Guillotine cutter, a reciprocating cutter type crusher, and a uniaxial-shear, biaxial-shear or triaxial-shear crusher is preferable. In pulverization, a Rockwell hardness (HRC) of a cutting blade contacting the solid block is preferably 40 to 70. The hardness is more preferably 45 or more. The hardness is more preferably 65 or less. A rotation speed of the cutting blade is preferably 200 to 550 rpm. The rotation speed is more preferably 225 rpm or more, further preferably 250 rpm or more. The rotation speed is more preferably 500 rpm or less, further preferably 450 rpm or less.

Conventionally, a solid block obtained in a saponification step has been generally pulverized by a pulverizer equipped with a cutting blade with a Rockwell hardness of less than 40, which is operated at a rotation speed of more than 550 rpm. Since the cutting blade used has a low Rockwell hardness, the cutting blade tends to be abraded and thus cutting using such an abraded cutting blade tends to lead to uneven pulverization. When a solid block is pulverized at a high rotation speed, the solid block is strongly vibrated up and down at the inlet of the crusher by impact of pulverization, leading to uneven breaking during pulverization. In such circumstances, it has been difficult to stably obtain particles having a particular particle size distribution as described later. If a Rockwell hardness of the cutting blade is more than 70, the blade is of high hardness while being of lower toughness, and thus during pulverization, fine chippings are generated in the cutting blade, leading to tendency to uneven pulverization. If a rotation speed of the pulverizer is less than 200 rpm, there is tendency to reduction in pulverization efficiency.

(Washing Step)

After the pulverizing step, if necessary, wet particles can be washed by adding a washing step for removing impurities such as sodium acetate. Examples of a washing liquid include lower alcohols such as methanol and ethanol; lower fatty acids such as methyl acetate; and mixtures thereof. There are no particular restrictions to the conditions of the washing step, and the particles are preferably washed at 20° C. to a boiling point of the washing liquid for 30 min to 10 hours.

(Deliquoring Step)

After the pulverizing step and sometimes after the washing step, some of the solvent was mechanically removed from the wet particles, to give deliquored particles. A deliquoring machine is preferably a centrifugal deliquoring machine. A centrifugal deliquoring machine is preferably able to conduct continuous centrifugal deliquoring, including an automatic discharge type centrifugal deliquoring machine, a screw discharge type centrifugal deliquoring machine, a vibration discharge type centrifugal deliquoring machine and an extrusion plate type centrifugal deliquoring machine. Conventionally, a squeeze deliquoring machine has been used for deliquoring of pulverized particles. However, for achieving a solvent content of deliquored particles obtained within the above particular range, squeezing strength must be increased, and consequently, the deliquored particles are deformed or broken so that a particle size distribution deviates from the range as described later. In other words, it is difficult to simultaneously achieve desired values of a particle size distribution and a solvent content of deliquored particles as described later by the conventional method. In the deliquoring step, by employing the above centrifugal deliquoring machine, deliquored particles having a particle size distribution and a solvent content as described later can be easily achieved.

It is important that deliquored particles thus obtained contains 40 to 65% by mass of a solvent. If a solvent content is less than 40% by mass, some particles are excessively dried, and after the drying step, an ethylene-vinyl alcohol copolymer (A) satisfying formula (I) cannot be obtained due to contamination with a poorly-soluble ethylene-vinyl alcohol copolymer. A solvent content is preferably 42% by mass or more, more preferably 45% by mass or more. If a solvent content is more than 65% by mass, difference in heat history between the surface and the inside of particles is generated, so that an ethylene-vinyl alcohol copolymer (A) satisfying formula (I) cannot be obtained and energy required for drying is increased. A solvent content is preferably 62% by mass or less, more preferably 59% by mass or less. A solvent content herein is an average of those of deliquored particles. A solvent content of deliquored particles is preferably lower by 3% by mass or more, more preferably by 5% by mass or more, further preferably 10% by mass or more, than a solvent content of wet particles.

It is important that in the deliquored particles, a content of particles passing through a sieve with a mesh size of 5.6 mm is 80% by mass or more, and a content of particles passing through a sieve with a mesh size of 1.0 mm is less than 2% by mass. In other words, it is important that not only coarse particles but also fine particles are not contained so much. Herein, a mesh size of a sieve is determined in accordance with a nominal mesh size of JIS Z 8801-1 (2006).

In the deliquored particles, a content of particles passing through a sieve with a mesh size of 5.6 mm is 80% by mass or more. If the deliquored particles contain many coarse particles, drying at a higher temperature or for a long time is required for fully drying the particles to the center, and energy required for drying is increased. Furthermore, by drying at a high temperature or for a long time, smaller particles are excessively crystallized, and thus after the drying step, contamination with poorly-soluble ethylene-vinyl alcohol copolymer particles occurs. Existence of coarse particles causes uneven heat transfer in a drier. Considering these situations, an ethylene-vinyl alcohol copolymer (A) satisfying formula (I) are not obtained. A content of particles passing through a sieve with a mesh size of 5.6 mm is preferably 82% by mass or more, more preferably 85% by mass or more. In the light of a production efficiency, a content of particles passing through a sieve with a mesh size of 5.6 mm is preferably 99% by mass or less, more preferably 98% by mass or less.

In the deliquored particles, a content of particles passing through a sieve with a mesh size of 1.0 mm is less than 2% by mass. If the deliquored particles contains many fine particles, subsequent drying causes excessive crystallization of the fine particles, leading to contamination with many poorly-soluble ethylene-vinyl alcohol copolymer particles after the drying step. Furthermore, the fine particles reside in the bottom of the drier and are excessively heated, leading to excessively higher crystallinity and again contamination with ethylene-vinyl alcohol copolymer particles with poor solubility. In such circumstances, an ethylene-vinyl alcohol copolymer (A) satisfying formula (I) cannot be obtained. A content of particles passing through a sieve with a mesh size of 1.0 mm is preferably 1.9% by mass or less, more preferably 1.8% by mass or less. In the light of a production efficiency, a content of particles passing through a sieve with a mesh size of 1.0 mm is preferably 0.05% by mass or more, more preferably 0.1% by mass or more.

(Drying Step)

The deliquored particles after the deliquoring step can be subjected to the drying step, to give an ethylene-vinyl alcohol copolymer. Specifically, hot-air drying using a cylindrical drier is preferable, and a particle temperature during the drying is preferably 80 to 120° C. If the temperature is too low, a production efficiently is reduced. The temperature is preferably 90° C. or higher. If the temperature is too high, excessively crystallized particles are generated, leading to deterioration in solubility. The temperature is more preferably 110° C. or lower. A drying time is preferably 2 to 10 hours, more preferably 3 to 8 hours. With drying conditions within the above ranges, an ethylene-vinyl alcohol copolymer satisfying formula (I) can be easily produced.

(Additional Pulverizing Step)

After the drying step, it is preferable that an additional pulverizing step for further reducing a particle size is conducted, whereby particles with a higher dissolution rate in water. A pulverizer used in the additional pulverizing step can be the same pulverizer as that used in the above pulverizing step.

Particles of the ethylene-vinyl alcohol copolymer (A) obtained by the additional pulverizing step preferably have a content of particles passing through a sieve with a mesh size of 2.5 mm of 80% by mass or more. If a content of particles passing through a sieve with a mesh size of 2.5 mm is less than 80% by mass, a dissolution rate is reduced when dissolving particles of the ethylene-vinyl alcohol copolymer (A) in water to prepare an aqueous solution, so that heating for a long time is required. A content of particles passing through a sieve with a mesh size of 2.5 mm is more preferably 83% by mass or more, further preferably 85% by mass or more. Furthermore, in the particles of ethylene-vinyl alcohol copolymer (A), a content of particles passing through a sieve with a mesh size of 1.0 mm is preferably 80% by mass or more. Thus, a dissolution rate in water is further improved. A content of particles passing through a sieve with a mesh size of 1.0 mm is more preferably 83% by mass or more, further preferably 85% by mass or more.

In the particles of ethylene-vinyl alcohol copolymer (A) obtained in the additional pulverizing step, a content of particles passing through a sieve with a mesh size of 0.15 mm is preferably 20% by mass or less. If a content of particles passing through a sieve with a mesh size of 0.15 mm is more than 20% by mass, a lump tends to be formed in an aqueous solution containing an ethylene-vinyl alcohol copolymer (A). A content of particles passing through a sieve with a mesh size of 0.15 mm is more preferably 17% by mass or less, further preferably 15% by mass or less.

[Aqueous Emulsion]

An aqueous emulsion of the present invention is an aqueous emulsion comprising an ethylene-vinyl alcohol copolymer (A) as a dispersant and a polymer (B) having an ethylenically unsaturated monomer unit as a dispersoid.

Examples of an ethylenically unsaturated monomer as a material for a polymer (B) containing an ethylenically unsaturated monomer unit include olefinic monomers such as ethylene, propylene and isobutylene; halogenated olefinic monomers such as vinyl chloride, vinyl fluoride, vinylidene chloride and vinylidene fluoride; vinyl ester monomers such as vinyl formate, vinyl acetate, vinyl propionate, vinyl versatate; (meth)acrylic acid ester monomers such as (meth) acrylic acid, methyl (meth)acrylate, ethyl (meth)acrylate, butyl (meth)acrylate, 2-ethylhexyl (meth)acrylate, dodecyl (meth)acrylate and 2-hydroxyethyl (meth)acrylate; (meth) acrylamide monomers such as dimethylaminoethyl (meth) acrylate and quaternized products thereof, (meth)acrylamide, N-methylol (meth)acrylamide, N,N-dimethyl (meth) acrylamide, and (meth)acrylamide-2-methyl propanesulfonate and sodium salt thereof; styrenic monomers such as styrene, α-methylstyrene, p-styrenesulfonic acid and sodium salts and potassium salts thereof; diene monomers such as butadiene, isoprene, and chloroprene; and N-vinylpyrrolidone. These can be used alone or in combination of two or more. In this specification, "(meth) acrylic" means acrylic and methacrylic.

Among the polymers (B) containing an ethylenically unsaturated monomer unit, preferred are polymers having a particular unit derived from at least one selected from the group consisting of a vinyl ester monomer, a (meth)acrylic acid ester monomer, a styrenic monomer, and a diene monomer. A content of the particular unit is preferably 70% by mass or more, more preferably 75% by mass or more, further preferably 80% by mass or more, particularly preferably 90% by mass or more based on the total monomer units of the polymer (B). If a content of the particular unit is less than 70% by mass, emulsion polymerization stability of the aqueous emulsion tends to be insufficient.

Further, among the above-mentioned particular units, vinyl ester monomers are particularly preferable, and vinyl acetate is most preferable. Specifically, a content of the vinyl ester monomer unit is preferably 70% by mass or more, and a content of the monomer unit derived from vinyl acetate is more preferably 70% by mass or more, further preferably 90% by mass or more based on the total monomer units of the polymer (B).

[Method for Producing an Aqueous Emulsion]

An exemplary method for producing an aqueous emulsion of the present invention comprises emulsion-polymerizing the ethylenically unsaturated monomer using a polymerization initiator in the presence of the ethylene-vinyl alcohol copolymer (A). An aqueous emulsion thus produced forms particularly less aggregates and is excellent in water resistance. A suitable production method comprises emulsion-polymerizing the ethylenically unsaturated monomer using a polymerization initiator in an aqueous solution prepared by dissolving particles of the ethylene-vinyl alcohol copolymer (A) satisfying formula (I) as a dispersant in water.

In this method, when an ethylene-vinyl alcohol copolymer (A) is charged in a polymerization system as a dispersant for emulsion polymerization, there are no particular restrictions to a charging or addition method; examples include initially adding the total amount of the dispersant for emulsion polymerization to a polymerization system, and continuously adding it during emulsion polymerization. Among these, in the light of improving a graft ratio of the ethylene-vinyl alcohol copolymer (A) to the ethylenically unsaturated monomer, it is preferable that the total amount of the dispersant for emulsion polymerization is initially added to the polymerization system. Here, it is preferable that the ethylene-vinyl alcohol copolymer (A) is added to cold water or pre-heated warm water and the mixture is stirred under heating at 80 to 90° C. for homogeneously dispersing the ethylene-vinyl alcohol copolymer (A).

A content of the ethylene-vinyl alcohol copolymer (A) as a dispersant for emulsion polymerization during emulsion polymerization is, but not limited to, preferably 0.2 parts by mass or more and 40 parts by mass or less, more preferably 0.3 parts by mass or more and 20 parts by mass or less, further preferably 0.5 parts by mass or more and 15 parts by mass or less based on 100 parts by mass of the ethylenically unsaturated monomer. If a content of the ethylene-vinyl alcohol copolymer (A) is less than 0.2 parts by mass, the aqueous emulsion tends to form dispersoid particle aggregates and lower polymerization stability. If a content of the ethylene-vinyl alcohol copolymer (A) is more than 40 parts by mass, viscosity of a polymerization system becomes too high to allow for evenly proceeding emulsion polymerization or tends to lead to insufficient removal of polymerization heat.

There are no particular restrictions to a ratio of the ethylene-vinyl alcohol copolymer (A) to the polymer (B) containing an ethylenically unsaturated monomer unit in an aqueous emulsion of the present invention, and a mass ratio (A)/(B) is preferably 98/2 to 80/20, more preferably 95/5 to 85/15 based on a solid content. If the mass ratio (A)/(B) is more than 98/2, viscosity stability of the aqueous emulsion obtained tends to be insufficient. If the mass ratio (A)/(B) is less than 80/20, water resistance of a film obtained tends to be insufficient.

A solid content in the aqueous emulsion of the present invention is, but not limited to, preferably 30% by mass or more and 60% by mass or less, more preferably 35% by mass or more and 55% by mass or less.

In the above emulsion polymerization, a polymerization initiator can be a water-soluble sole initiator or a water-soluble redox initiator which are commonly used for emulsion polymerization. These initiators can be used alone or in combination of two or more. Among these, a redox initiator is preferable.

Water-soluble sole initiators include peroxides such as an azo initiator, hydrogen peroxide, and a persulfate salt (potassium, sodium or ammonium salt). Examples of an azo initiator include 2,2'-azobis(isobutyronitrile), 2,2'-azobis(2, 4-dimethylvaleronitrile), and 2,2'-azobis(4-methoxy-2,4-dimethylvaleronitrile).

A redox initiator can be a combination of an oxidizing agent and a reducing agent. The oxidizing agent is preferably a peroxide. The reducing agent can be metal ions, a reductive compound or the like. Example of a combination of an oxidizing agent and a reducing agent include a combination of a peroxide and metal ions; a combination of a peroxide and a reductive compound; and a combination of a peroxide, metal ions and a reductive compound. Examples of a peroxide include hydrogen peroxide; hydroxyperoxides such as cumene hydroxyperoxide and t-butyl hydroxyperoxide; persulfate salts (potassium, sodium or ammonium salt), t-butyl peracetate; and peracid esters (t-butyl perbenzoate). Examples of metal ions include metal ions such as $Fe^{2+}$, $Cr^{2+}$, $V^{2+}$, $Co^{2+}$, $Ti^{3+}$ and $Cu^{+}$, which can involve one-electron transfer. Examples of a reductive compound include sodium hydrogen sulfite, sodium hydrogen carbonate, tartaric acid, fructose, dextrose, sorbose, inositol, Rongalite and ascorbic acid. Among these, preferred is a combination of one or more oxidizing agents selected from the group consisting of hydrogen peroxide, potassium persulfate, sodium persulfate and ammonium persulfate and one or more reducing agents selected from the group consisting of sodium hydrogen sulfite, sodium hydrogen carbonate, tartaric acid, Rongalite and ascorbic acid, and more preferred is a combination of hydrogen peroxide and one or more reducing agents selected from the group consisting of sodium hydrogen sulfite, sodium hydrogen carbonate, tartaric acid, Rongalite and ascorbic acid.

In emulsion polymerization, an alkali metal compound, a surfactant, a buffering agent, a polymerization regulator and the like can be appropriately used as long as the effects of the present invention are not impaired.

There are no particular restrictions to an alkali metal compound as long as it contains an alkali metal (sodium, potassium, rubidium, and cesium) and it can be just alkali metal ions or a compound containing an alkali metal.

A content of an alkali metal compound (in terms of alkali metal) can be appropriately selected depending on the type of the alkali metal compound used, and a content of the alkali metal compound (in terms of alkali metal) is preferably 100 to 15000 ppm, more preferably 120 to 12000 ppm, further preferably 150 to 8000 ppm based on the total mass of the aqueous emulsion (in terms of solid). If a content of the alkali metal compound is less than 100 ppm, emulsion polymerization stability tends to be reduced, while if it is more than 15000 ppm, a film obtained tends to be stained. A content of the alkali metal compound can be determined by an ICP emission analysis device. Herein, "ppm" means "ppm by mass".

Specific examples of a compound containing an alkali metal include weakly basic alkali metal salts (for example, alkali metal carbonates, alkali metal acetates, alkali metal bicarbonates, alkali metal phosphates, alkali metal sulfates, alkali metal halogenates, alkali metal nitrates), and strongly basic alkali metal compounds (for example, alkali metal hydroxides, alkali metal alkoxides). These alkali metal compounds can be used alone or in combination of two or more.

Examples of a weakly basic alkali metal salt include alkali metal carbonates (for example, sodium carbonate, potassium carbonate, rubidium carbonate, cesium carbonate), alkali metal bicarbonates (for example, sodium hydrogen carbonate, potassium hydrogen carbonate and the like), alkali metal phosphates (sodium phosphate, potassium phosphate and the like), alkali metal carboxylates (sodium acetate, potassium acetate, cesium acetate and the like), alkali metal sulfates (sodium sulfate, potassium sulfate, cesium sulfate and the like), alkali metal halogenates (cesium chloride, cesium iodide, potassium chloride, sodium chloride and the like), and alkali metal nitrates (sodium nitrate, potassium nitrate, cesium nitrate and the like). Among these, in the light of the fact that an emulsion becomes basic, alkali metal carboxylates, alkali metal carbonates and alkali metal bicarbonates which can behave as a salt of a weak acid and a strong base during dissociation are preferable, and alkali metal carboxylates are more preferable.

These weakly basic alkali metal salts can act as a pH buffering agent in emulsion polymerization to allow the emulsion polymerization to stably proceed.

A surfactant can be any of a nonionic surfactant, an anionic surfactant and a cationic surfactant. Examples of a nonionic surfactant include, but not limited to, a polyoxyethylene alkyl ether, a polyoxyethylene alkylphenyl ether, a polyoxyethylene fatty acid ester, a polyoxyalkylene alkyl ether, a polyoxyethylene derivative, a sorbitan fatty acid ester, a polyoxyethylene sorbitan fatty acid ester, a polyoxyethylene sorbitol fatty acid ester, and a glycerol fatty acid ester. Examples of an anionic surfactant include, but not limited to, an alkyl sulfate, an alkyl aryl sulfate, an alkyl sulfonate, a sulfate of a hydroxyalkanol, a sulfosuccinic acid ester, and a sulfate and a phosphate of an alkyl or alkylaryl polyethoxyalkanol. Examples of a cationic surfactant include, but not limited to, an alkylamine salt, a quaternary ammonium salt, and a polyoxyethylenealkylamine. The amount of a surfactant is preferably 2% by mass or less based on the total amount of ethylenically unsaturated monomers (for example, vinyl acetate) in the light of water resistance, warm water resistance and boiling resistance.

Examples of a buffering agent include acids such as acetic acid, hydrochloric acid and sulfuric acid; bases such as ammonia, an amine, sodium hydroxide, potassium hydroxide and calcium hydroxide; and an alkali metal carbonate, a phosphoric acid salt and an acetic acid salt. Examples of a polymerization regulator include mercaptans and alcohols.

A dispersion medium in the above emulsion polymerization is preferably an aqueous medium containing water as a main component. The aqueous medium containing water as a main component can contain a water-soluble organic solvent which is miscible with water in any proportion (for example, alcohols and ketones). Herein, an "aqueous medium containing water as a main component" is a dispersion medium containing water in 50% by mass or more. In the light of a cost and an environmental burden, the dispersion medium is preferably an aqueous medium containing water in 90% by mass or more, more preferably water. In the above method for producing an aqueous emulsion, it is preferable that before initiation of emulsion polymerization, the ethylene-vinyl alcohol copolymer (A) as a dispersant is heated to be dissolved in the dispersion medium, followed by cooling and nitrogen substitution. A heating temperature is preferably 90° C. or higher. An emulsion polymerization temperature is, but not limited to, preferably about 20 to 85° C., more preferably about 40 to 80° C.

(Additive (C))

In the light of further improving film formability, it is preferable that an aqueous emulsion of the present invention further contains an additive (C). The additive (C) is preferably an alkylene glycol derivative having a solubility parameter (SP value) of 19.0 to 24.0 $(MPa)^{1/2}$. Here, an alkylene glycol derivative means a compound having at least one alkylene glycol unit in its structure.

There are no particular restrictions to a method for adding an additive (C); for example, the whole amount can be preliminarily added into a polymerization system; it is continuously fed into an emulsion polymerization system; and the whole amount is added into an aqueous emulsion produced by emulsion polymerization.

Herein, a solubility parameter (SP value) is calculated in $(MPa)^{1/2}$ by Small's equation represented by Equation (IV).

$$SP=(d\Sigma G)/M \qquad (IV)$$

wherein d represents a density; G represents a specific constant for an atomic group or a group (employing a Small's value); M represents a molecular weight; and an SP value is in $(MPa)^{1/2}$.

Examples of such an additive (C) include monoalkyl ethers such as propylene glycol-mono-2-ethyl hexanoate (Waijinol® EHP01: SP value=22.5), diethylene glycol monobutyl ether (DEMB: SP value=20.4), dipropylene glycol monobutyl ether (DPMB: SP value=20.0), dipropylene glycol monomethyl ether (DPM: SP value=20.0), tripropylene glycol monomethyl ether (TPM: SP value=19.7), ethylene glycol monobutyl ether (EMB: SP value=19.3), ethylene glycol mono-t-butyl ether (ETB: SP value=20.8), propylene glycol monomethyl ether (PM: SP value=19.7), 2,2,4-trimethylpentane-1,3-diol monoisobutyrate (Texanol®: SP value=19.4), ethyl cellosolve (SP value=22.1), butyl cellosolve (SP value=23.2), ethyl carbitol (SP value=20.5) and butyl carbitol (SP value=20.6); and polyalkylene glycol adducts such as polyethylene glycol monophenyl ether (SP value=19.2). Among these, in the light of film formability of an aqueous emulsion obtained, propylene glycol-mono-2-ethyl hexanoate (Waijinol EHP01: SP value=22.5) or diethylene glycol monobutyl ether (DEMB: SP value=20.4) is preferable.

The amount of the additive (C) is, but not limited to, preferably 0.1 to 10 parts by mass, more preferably 0.5 to 8 parts by mass, further preferably 1.0 to 7.5 parts by mass based on 100 parts by mass of solids in the aqueous emulsion. If the amount of the additive (C) is less than 0.1 parts by mass, film formability at a low temperature is so low that a film tends to be uneven, while if the amount is more than 10 parts by mass, the additive (C) tends to segregate on the surface of the film or adhesiveness tends to be lowered.

[Adhesive]

The aqueous emulsion of the present invention obtained by the above method can be used for adhesive applications such as woodworking and paper processing, as well as for paints and fiber processing, particularly suitably for adhesive applications. The aqueous emulsion can be used as it is, and if necessary, it can be combined with various conventionally known emulsions and commonly used additives to form an emulsion composition as long as the effects of the present invention are not impaired. Examples of the additive include organic solvents (aromatic compounds such as toluene and xylene, alcohols, ketones, esters, halogen-containing solvents, and the like), cross-linking agents, surfactants, plasticizers, precipitation-preventing agents, thickeners, fluidity improvers, preservatives, defoamers, fillers, wetting agents, colorants, binders and water retention agents. These can be used alone or in combination of two or more.

An adherend for the adhesive obtained by the above method can be papers, woods, plastics and the like. The adhesive is particularly suitable for woods among these materials, and can be applied to applications such as a laminated lumber, a plywood, a decorative plywood, and a fiber board.

In addition, the aqueous emulsion of the present invention can be used in a wide range of applications such as inorganic binders, cement admixtures and mortar primers. Further, it can be effectively used as a so-called powder emulsion in which the aqueous emulsion obtained is powdered by spray drying or the like.

The present invention includes various combinations of the above configurations within the technical scope of the present invention as long as the effects of the present invention are exhibited.

As described above, the aqueous emulsion of the present invention uses an ethylene-vinyl alcohol copolymer exhibiting excellent handleability as an emulsion polymerization stabilizer, so that it forms less agglomerates and is excellent in water resistance and film formability. Therefore, the aqueous emulsion is suitably used for various adhesives, paints, fiber processing agents, paper processing agents, inorganic binders, cement admixtures, mortar primers and the like.

EXAMPLES

There will be further specifically described the present invention with reference to examples, but the present invention is not limited to these examples in any way.

[Content of Ethylene Units in an Ethylene-Vinyl Alcohol Copolymer (A)]

It was determined from $^1$H-NMR of an ethylene-vinyl ester copolymer as a precursor or re-acetylation product of an ethylene-vinyl alcohol copolymer. Specifically, an ethylene-vinyl ester copolymer obtained was reprecipitation-purified three times or more using a mixed solution of n-hexane and acetone, and then dried under reduced pressure at 80° C. for 3 days, to prepare an ethylene-vinyl ester copolymer for analysis. The ethylene-vinyl ester copolymer for analysis was dissolved in DMSO-$d_6$ and analyzed by $^1$H-NMR (500 MHz) at 80° C. A content of ethylene units was calculated using peaks derived from a main-chain methine of the vinyl ester (4.7 to 5.2 ppm) and peaks derived from a main-chain methylene of ethylene and the vinyl ester (0.8 to 1.6 ppm).

[Viscosity-Average Polymerization Degree of an Ethylene-Vinyl Alcohol Copolymer (A)]

A viscosity-average polymerization degree of an ethylene-vinyl alcohol copolymer (A) was determined in accordance with the method as described in JIS K6726 (1994).

[Saponification Degree of an Ethylene-Vinyl Alcohol Copolymer (A)]

A saponification degree of an ethylene-vinyl alcohol copolymer (A) was determined in accordance with the method as described in JIS K6726 (1994).

[Crystallinity in Water of an Ethylene-Vinyl Alcohol Copolymer (A)]

A sample of an ethylene-vinyl alcohol copolymer (A) was still placed in $H_2O$-$d_2$ at each temperature (30° C., 70° C.) for 40 min, followed by pulse NMR spectroscopy at the same temperature as that during still placing. The range from 0 to 0.8 ms in a relaxation curve obtained was fitted to formula (III) using the least square error method.

$$y = y_0 + A_1 \times \exp\left[-0.5 \times \left(\frac{t}{Tau_1}\right)^2\right] + A_2 \times \exp\left[-\frac{1}{W} \times \left(\frac{t}{Tau_2}\right)^W\right] \quad \text{(III)}$$

[Lump Forming Property]

In a 300 mL separable flask was placed 150 mL of distilled water, which was then heated to an internal temperature of 70° C. After the heating, 6 g of an ethylene-vinyl alcohol copolymer was added with stirring at 150 rpm. The state of the ethylene-vinyl alcohol copolymer particles immediately after the addition was visually observed and evaluated as described below.

A: No lumps were formed.

B: Lumps were formed but disappeared after stirring for 5 min.

C: Lumps were formed and did not disappear after stirring for 5 min.

[Solubility]

In a 500 mL separable flask was placed 288 g of distilled water, which was then heated to an internal temperature of 85° C. After the heating, 12 g of an ethylene-vinyl alcohol copolymer was added with stirring at 150 rpm. Thirty minutes after the addition, the aqueous solution of the ethylene-vinyl alcohol copolymer was collected. The collected aqueous solution was filtrated through a No. 5A filter, and the filtrate was dried at 125° C. for 3 hours, and the mass A (g) of the ethylene-vinyl alcohol copolymer dissolved in the aqueous solution was determined. Furthermore, 12 g of the ethylene-vinyl alcohol copolymer particle sample was dried at 125° C. for 3 hours, and the mass B (g) of non-volatile components was determined. Then, a solubility (% by mass)=A/B×100 was calculated. The calculated solubility was evaluated in accordance with the following criteria.

A: 60% by mass or more

B: 50% by mass or more and less than 60% by mass
C: less than 50% by mass

The presence of agglomerates in an aqueous emulsion, water-resistant adhesive performance, and film formability were evaluated as described below.

[Amount of aggregates]

500 g of the aqueous emulsions obtained in Examples and Comparative Examples were filtered through a 60-mesh wire mesh, and the filtration residue was weighed and evaluated as described below.

A: Filtration residue is less than 1.0% by mass.
B: Filtration residue is 1.0% by mass or more and less than 2.5% by mass.
C: Filtration residue is 2.5% by mass or more and less than 5.0% by mass.
D: Filtration residue is 5.0% by mass or more, and filtration is difficult.

[Water-Resistant Adhesiveness]

Water-resistant adhesiveness was evaluated in accordance with JIS K6852 (1994).

(Adhesion Conditions)

Adhesive material: *Tsuga* (southern Japanese hemlock)/*Tsuga*

Coating amount: 150 g/m² (double-side coating)

Pressing conditions: 20° C., 24 hours, pressure 10 kg/cm²

(Measurement Conditions)

A test piece cured under the environment of 20° C. and 65% RH for 7 days was immersed in water at 60° C. for 3 hours, and then in a wet state, an adhesive strength was measured (in kgf/cm²).

[Film Formability]

Using a minimum film-forming temperature (MFFT) measuring device (MFFT-60 from Rhopoint Instruments), a minimum film-forming temperature (° C.) of a film formed from an aqueous emulsion cast to a thickness of 0.3 mm was measured. In evaluating film formability, the lower the minimum film-forming temperature (° C.) is, the better film formability at low temperature is.

Production Example 1

(Polymerization Step)

A continuous polymerization tank equipped with a reflux condenser, a material supply line, a reaction liquid removing line, a thermometer, a nitrogen inlet, an ethylene inlet and a stirring blade was used. To the continuous polymerization tank were continuously supplied 671 L/hr of vinyl acetate, 147 L/hr of methanol, and 2.6 L/hr of a 1% solution of 2,2'-azobis(4-methoxy-2,4-dimethylvaleronitrile) in methanol, using a constant rate pump. An ethylene pressure in the tank was adjusted to be 0.23 MPa. A polymerization solution was continuously removed from the continuous polymerization tank such that the liquid level in the polymerization tank was kept constant. The reaction was adjusted such that a polymerization ratio at the outlet of the continuous polymerization tank was 30%. A residence time in the continuous polymerization tank was 5 hours. A temperature at the outlet of the continuous polymerization tank was 60° C. A polymerization liquid was collected from the continuous polymerization tank and methanol vapor was introduced to the collected liquid to remove unreacted vinyl acetate monomer, to give a solution of an ethylene-vinyl ester copolymer (PVAc) in methanol (concentration: 32% by mass).

(Saponification Step)

To a solution of the ethylene-vinyl ester copolymer obtained in the polymerization step in methanol (concentration: 32% by mass) was added a solution of sodium hydroxide in methanol (concentration: 4% by mass) as a saponification catalyst, such that a molar ratio of sodium hydroxide to vinyl acetate units in the ethylene-vinyl ester copolymer was 0.01. The solution of the ethylene-vinyl ester copolymer and the solution of the saponification catalyst were mixed by a static mixer, to give a mixture. The mixture paste thus obtained was placed on a belt and kept at 40° C. for 18 min to allow a saponification reaction to proceed. Thus, a solid block containing the ethylene-vinyl alcohol copolymer and the solvent was obtained. The polymerization conditions and the saponification conditions are summarized in Table 1.

(Pulverizing Step)

The solid block obtained in the saponification step was pulverized by a uniaxial-shear crusher to give wet particles. The crusher was equipped with a cutting blade with a Rockwell hardness of 45, and a rotation speed of the cutting blade was 250 rpm.

(Deliquoring Step)

The wet particles obtained in the pulverizing step was deliquored by a screw discharge type centrifugal deliquoring machine, to give deliquored particles, in which a proportion of particles passing through a sieve with a mesh size of 5.6 mm was 94% by mass, a proportion of particles passing through a sieve with a mesh size of 1.0 mm was 1.6% by mass, and a solvent content was 58% by mass. The pulverization conditions and the deliquoring conditions are summarized in Table 2.

(Drying Step)

To a drier in which an internal temperature was controlled such that a particle temperature was 100° C. was continuously fed 600 kg/hr (solid) of deliquored particles obtained in the deliquoring step. An average residence time of the particles in the drier was 4 hours.

(Additional Pulverization Process)

The dried particles obtained in the drying step were additionally pulverized by a hammer mill and passed through a filter having a mesh size of 1.4 mm to obtain an ethylene-vinyl alcohol copolymer 1. A content of ethylene units in the copolymer 1 was 2 mol %, a viscosity-average polymerization degree was 1700, and a saponification degree was 93.0 mol %. A Cw (30° C.) of the copolymer 1 was 9.7%, a Cw (70° C.) was 2.1%, and a value of formula (I) was 6.9. Further, in the entire copolymer 1, a rate of particles passing through the filter with a mesh size of 2.5 mm was 99% by mass; a rate of particles passing through the filter with a mesh size of 1.0 mm was 94% by mass; and a rate of particles passing through the filter with a mesh size of 0.15 mm was 5% by mass. Table 3 summarizes the evaluation results for a polymerization degree, a saponification degree, crystallinity in water at 30° C. and 70° C., and a value of formula (I) of the copolymer 1 in accordance with the methods described above, as well as the evaluation results for lump forming property and solubility of the copolymer 1 in accordance with the methods described above.

Production Examples 2 to 7

Ethylene-vinyl alcohol copolymers (Copolymers 2 to 7) were produced as described in Example 1, except that the conditions of polymerization, saponification, pulverization and deliquoring were changed as shown in Tables 1 and 2. Table 3 summarizes the evaluation results for a polymerization degree, a saponification degree, crystallinity in water at 30° C. and 70° C., and a value of formula (I) of the copolymers obtained in accordance with the methods described above, as well as the evaluation results for lump forming property and solubility of the copolymers obtained in accordance with the methods described above.

TABLE 1

| | | Polymerization Conditions | | | | | Saponification Conditions | |
| --- | --- | --- | --- | --- | --- | --- | --- | --- |
| | Copolymer | Ethylene (MPa) | Vinyl acetate (L/hr) | Methanol (L/hr) | Initiator (L/hr) | Polymerization ratio (%) | PVAc concentration (% by mass) | NaOH (molar ratio) |
| Production Example 1 | Copolymer 1 | 0.23 | 671 | 147 | 2.6 | 30 | 32 | 0.01 |
| Production Example 2 | Copolymer 2 | 0.47 | 726 | 113 | 2.2 | 28 | 30 | 0.012 |
| Production Example 3 | Copolymer 3 | 0.61 | 631 | 160 | 7.6 | 43 | 40 | 0.02 |
| Production Example 4 | Copolymer 4 | 0.69 | 626 | 170 | 75.8 | 70 | 45 | 0.015 |
| Production Example 5 | Copolymer 5 | 0.23 | 671 | 147 | 2.6 | 30 | 32 | 0.01 |
| Production Example 6 | Copolymer 6 | 0.26 | 741 | 64 | 1.7 | 26 | 25 | 0.02 |
| Production Example 7 | Copolymer 7 | 0.23 | 671 | 147 | 2.6 | 30 | 32 | 0.01 |

TABLE 2

| | | Pulverization Conditions | | | Deliquored particles | | |
| --- | --- | --- | --- | --- | --- | --- | --- |
| | Copolymer | Rotation speed (rpm) | Rockwell hardness | Deliquoring conditions Type of deliquoring machine | Mesh size 5.6 mm passing (% by mass) | Mesh size 1.0 mm passing (% by mass) | Solvent content (% by mass) |
| Production Example 1 | Copolymer 1 | 250 | 45 | Screw discharge type centrifugal deliquoring machine | 94 | 1.6 | 58 |
| Production Example 2 | Copolymer 2 | 450 | 55 | Screw discharge type centrifugal deliquoring machine | 89 | 0.6 | 47 |
| Production Example 3 | Copolymer 3 | 500 | 55 | Screw discharge type centrifugal deliquoring machine | 87 | 0.5 | 44 |
| Production Example 4 | Copolymer 4 | 450 | 60 | Screw discharge type centrifugal deliquoring machine | 98 | 1.8 | 50 |
| Production Example 5 | Copolymer 5 | 600 | 35 | Screw discharge type centrifugal deliquoring machine | 77 | 0.1 | 60 |
| Production Example 6 | Copolymer 6 | 450 | 60 | Squeeze deliquoring machine | 100 | 20 | 40 |
| Production Example 7 | Copolymer 7 | 600 | 35 | Squeeze deliquoring machine | 76 | 2.3 | 62 |

TABLE 3

| | | Ethylene-vinyl alcohol copolymer (A) | | | | | | | | | Evaluation | |
| --- | --- | --- | --- | --- | --- | --- | --- | --- | --- | --- | --- | --- |
| | Copolymer | Ethylene unit content (mol %) | Polymerization degree | Saponification degree (mol %) | Mesh size 2.5 mm passing (% by mass) | Mesh size 1.0 mm passing (% by mass) | Mesh size 0.15 mm passing (% by mass) | Cw(30° C.) % | Cw(70° C.) % | Value of formula (I) | Lump forming property | Solubility |
| Production Example 1 | Copolymer 1 | 2 | 1700 | 93.0 | 99 | 94 | 5 | 9.7 | 2.1 | 6.9 | A | A |
| Production Example 2 | Copolymer 2 | 4 | 1700 | 98.5 | 99 | 95 | 4 | 48.2 | 11.7 | 18.9 | A | A |
| Production Example 3 | Copolymer 3 | 6 | 1000 | 99.2 | 99 | 93 | 7 | 51.4 | 16.8 | 16.8 | A | B |
| Production Example 4 | Copolymer 4 | 10 | 400 | 98.0 | 99 | 93 | 12 | 69.1 | 26.7 | 13.1 | A | A |
| Production Example 5 | Copolymer 5 | 2 | 1700 | 93.0 | 99 | 96 | 7 | 4.9 | 1.3 | 3.4 | C | C |
| Production Example 6 | Copolymer 6 | 2 | 2300 | 99.3 | 99 | 95 | 11 | 56 | 5.4 | 22.3 | A | C |
| Production Example 7 | Copolymer 7 | 2 | 1700 | 93.0 | 99 | 94 | 7 | 4.6 | 1.6 | 2.9 | C | C |

Example 1

(Preparation of an Aqueous Emulsion)

Into a one-liter glass polymerization vessel equipped with a reflux condenser, a dropping funnel, a thermometer and a nitrogen inlet, 275 g of ion-exchange water was charged and the mixture was heated to 85° C. In the vessel, 20.9 g of copolymer 1 was dispersed, and dissolved with stirring for 45 min. Then, 0.3 g of sodium acetate was added, and the mixture was mixed and dissolved. Next, the aqueous solution in which the copolymer 1 was dissolved was cooled and nitrogen-substituted, then heated to 60° C. with stirring at 200 rpm, then 2.4 g of a 20% by mass aqueous solution of tartaric acid and 3.2 g of a 5% by mass hydrogen peroxide solution were shot-added, then 27 g of vinyl acetate was charged, and then polymerization was initiated. Thirty minutes after the polymerization initiation, completion of the initial polymerization was confirmed (the amount of residual vinyl acetate is less than 1%). After shot-adding 1 g of a 10% by mass aqueous solution of tartaric acid and 3.2 g of a 5% by mass hydrogen peroxide solution, 251 g of vinyl acetate was continuously fed over 2 hours while a polymerization temperature was maintained at 80° C. for completing the polymerization, to obtain a polyvinyl acetate emulsion with a solid concentration of 49.8% by mass.

To 100 parts by mass (solid) of the polyvinyl acetate emulsion thus obtained was added 5 parts by mass of propylene glycol-mono-2-ethyl hexanoate (Waijinol® EHP01: SP value=22.5 (MPa)$^{1/2}$, from Yokkaichi Chemical Co., Ltd.), and the mixture was mixed to obtain an aqueous emulsion of the present invention. Table 4 summarizes the evaluation results for the amount of aggregates formed, water-resistant adhesiveness and film formability of the aqueous emulsion obtained in accordance with the above methods.

Examples 2 to 6 and Comparative Examples 1 to 4

Aqueous emulsions were prepared as described in Example 1, substituting various ethylene-vinyl alcohol copolymers shown in Table 4 or an unmodified polyvinyl alcohol (Kuraray Poval 22-88) for the copolymer 1 of Example 1, and substituting the compounds shown in Table 4 for Waijinol EHP01 as an additive (C). Table 4 summarizes the evaluation results for the amount of aggregates formed, water-resistant adhesiveness and film formability of the aqueous emulsion obtained in accordance with the above methods.

Example 7

Into a 5-liter pressure-resistant autoclave equipped with a nitrogen inlet, a thermometer and a stirrer were charged 75.7 g of copolymer 1, 1451.2 g of ion-exchange water, 0.85 g of Rongalite, 0.5 g of sodium acetate, and 0.04 g of ferrous chloride, and the mixture was heated to 85° C. to obtain an aqueous solution. Then, the aqueous solution in which the copolymer 1 was dissolved was cooled to 60° C., and nitrogen-substituted. Then, 1516.1 g of vinyl acetate was charged, ethylene was introduced to a pressure of 4.4 MPa, 100 g of a 4% by mass aqueous solution of hydrogen peroxide was injected into the mixture over 5 hours, and emulsion polymerization was conducted at 60° C. Once a concentration of the residual vinyl acetate reached 10%, ethylene was released to an ethylene pressure of 2.0 MPa, and 5 g of a 3% by mass aqueous solution of hydrogen peroxide was injected into the mixture to complete the polymerization. After cooling, the mixture was filtrated with a 60-mesh stainless wire mesh to obtain an ethylene-vinyl acetate copolymer resin emulsion with a solid concentration of 55.3% by mass. In the emulsion, a content of vinyl ester (particular unit) was 82% by mass based on the total monomer units of the polymer as a dispersoid (an ethylene content was 18% by mass).

To 100 parts by mass of the solid of the above ethylene-vinyl acetate copolymer resin emulsion was added 2 parts by mass of diethylene glycol monobutyl ether (DEMB, SP value=20.4 (MPa)$^{1/2}$), to prepare an aqueous emulsion. Table 4 summarizes the evaluation results for the amount of aggregates formed, water-resistant adhesiveness and film formability of the aqueous emulsion obtained in accordance with the above methods.

Example 8

An aqueous emulsion was obtained as described in Example 7, substituting copolymer 2 for copolymer 1 and substituting Waijinol EHP01 for DEMB as an additive (C). Table 4 summarizes the evaluation results for the amount of aggregates formed, water-resistant adhesiveness and film formability of the aqueous emulsion obtained in accordance with the above methods.

TABLE 4

| | Aqueous emulsion | | | Evaluation | | |
|---|---|---|---|---|---|---|
| | Copolymer (A) | Polymer (B) | Additive (C)[2] | Amount of aggregates formed | Water-resistant adhesiveness (kgf/cm$^2$) | Film formability[3] (° C.) |
| Example 1 | Copolymer 1 | PVAc | Waijinol EHP01 | A | 9.8 | 2 |
| Example 2 | Copolymer 1 | PVAc | DBP | A | 10.1 | 8 |
| Example 3 | Copolymer 1 | PVAc | — | A | 10.9 | 15 |
| Example 4 | Copolymer 2 | PVAc | Waijinol EHP01 | A | 19.3 | 2 |
| Example 5 | Copolymer 3 | PVAc | Waijinol EHP01 | B | 22.5 | 2 |
| Example 6 | Copolymer 4 | PVAc | Waijinol EHP01 | A | 23.1 | 2 |
| Example 7 | Copolymer 1 | PVAc/Et (8/2) | DEMB | A | 5.6 | 0 |
| Example 8 | Copolymer 2 | PVAc/Et (8/2) | Waijinol EHP01 | A | 8.2 | −1 |
| Comparative Example 1 | KP 22-88[1] | PVAc | Waijinol EHP01 | A | 2.0 | 3 |
| Comparative Example 2 | Copolymer 5 | PVAc | Waijinol EHP01 | C | 4.8 | 2 |
| Comparative Example 3 | Copolymer 6 | PVAc | Waijinol EHP01 | D | 12.1 | 2 |

TABLE 4-continued

| | Aqueous emulsion | | | Evaluation | | |
|---|---|---|---|---|---|---|
| | Copolymer (A) | Polymer (B) | Additive (C)[2] | Amount of aggregates formed | Water-resistant adhesiveness (kgf/cm²) | Film formability[3] (° C.) |
| Comparative Example 4 | Copolymer 7 | PVAc | Waijinol EHP01 | C | 3.5 | 2 |

[1]Kuraray Poval 22-88: Unmodified polyvinyl alcohol having a viscosity-average polymerization degree of 1700 and a saponification degree of 88 mol %
[2]Waijinol EHP01: Propylene glycol-mono-2-ethyl hexanoate (SP value = 22.5)
DBP: Dibutyl phthalate
DEMB: Diethylene glycol monobutyl ether (SP value = 20.4)
[3]Minimum film-forming temperature (° C.)

The invention claimed is:

1. An aqueous emulsion, comprising:
an ethylene-vinyl alcohol copolymer (A) as a dispersant; and
a polymer (B) comprising an ethylenically unsaturated monomer unit as a dispersoid,
wherein the ethylene-vinyl alcohol copolymer (A) has an ethylene unit content in a range of from 1 to less than 20 mol %, and
wherein the ethylene-vinyl alcohol copolymer (A) has a crystallinity in water at 30° C. (Cw (30° C.)) and a crystallinity in water at 70° C. (Cw (70° C.)) as determined by pulse NMR satisfying formula (I)

$$4 \leq \frac{100 - Cw(30°C)}{100} \times [Cw(30°C) - Cw(70°C)] \leq 22. \quad (I)$$

2. The emulsion of claim 1, wherein the ethylene-vinyl alcohol copolymer (A) has a viscosity-average polymerization degree in a range of from 200 to 5000 and a saponification degree in a range of from 85 to 99.9 mol %.

3. The emulsion of claim 1, wherein the polymer (B) has a repeating unit derived from at least one selected from the group consisting of a vinyl ester monomer, a (meth) acrylic acid ester monomer, a styrenic monomer, and a diene monomer, and
wherein a content of the repeating unit is 70% by mass or more, based on total monomer units of the polymer (B).

4. The emulsion of claim 1, wherein a mass ratio (A)/(B) of the ethylene-vinyl alcohol copolymer (A) to the polymer (B) is in a range of from 98/2 to 80/20, based on a solid content.

5. The emulsion of claim 1, further comprising an additive (C), which is an alkylene glycol derivative having a solubility parameter (SP value) in a range of from 19.0 to 24.0 (MPa)$^{1/2}$.

6. An adhesive, prepared using the aqueous emulsion of claim 1.

7. A method for producing the aqueous emulsion of claim 1, the method comprising:
emulsion-polymerizing the ethylenically unsaturated monomer in the presence of the dispersant comprising the ethylene-vinyl alcohol copolymer (A).

8. The emulsion of claim 2, wherein the polymer (B) comprises, in polymerized form, a vinyl ester monomer, a (meth)acrylic acid ester monomer, a styrenic monomer, and/or a diene monomer, in an amount of at least 70% by mass, based on total monomer units of the polymer (B).

9. The emulsion of claim 2, wherein a mass ratio (A)/(B) of the ethylene-vinyl alcohol copolymer (A) to the polymer (B) is in a range of from 98/2 to 80/20, based on a solid content.

10. The emulsion of claim 2, wherein the polymer (B) comprises, in polymerized form, a vinyl ester monomer, a (meth)acrylic acid ester monomer, a styrenic monomer, and/or a diene monomer, in an amount of at least 70% by mass, based on total monomer units of the polymer (B), and
wherein a mass ratio (A)/(B) of the ethylene-vinyl alcohol copolymer (A) to the polymer (B) is in a range of from 98/2 to 80/20, based on a solid content.

11. The emulsion of claim 2, further comprising:
an additive (C), which is an alkylene glycol derivative having a solubility parameter (SP value) in a range of from 19.0 to 24.0 (MPa)$^{1/2}$.

12. The emulsion of claim 8, further comprising:
an additive (C), which is an alkylene glycol derivative having a solubility parameter (SP value) in a range of from 19.0 to 24.0 (MPa)$^{1/2}$.

13. The emulsion of claim 9, further comprising:
an additive (C), which is an alkylene glycol derivative having a solubility parameter (SP value) in a range of from 19.0 to 24.0 (MPa)$^{1/2}$.

14. The emulsion of claim 10, further comprising:
an additive (C), which is an alkylene glycol derivative having a solubility parameter (SP value) in a range of from 19.0 to 24.0 (MPa)$^{1/2}$.

15. The emulsion of claim 5, wherein the alkylene glycol derivative has a solubility parameter (SP value) in a range of from 19.0 to 22.5 (MPa)$^{1/2}$.

16. The emulsion of claim 11, wherein the alkylene glycol derivative has a solubility parameter (SP value) in a range of from 19.0 to 22.5 (MPa)$^{1/2}$.

17. The emulsion of claim 12, wherein the alkylene glycol derivative has a solubility parameter (SP value) in a range of from 19.0 to 22.5 (MPa)$^{1/2}$.

18. The emulsion of claim 13, wherein the alkylene glycol derivative has a solubility parameter (SP value) in a range of from 19.0 to 22.5 (MPa)$^{1/2}$.

19. The emulsion of claim 14, wherein the alkylene glycol derivative has a solubility parameter (SP value) in a range of from 19.0 to 22.5 (MPa)$^{1/2}$.

* * * * *